(12) United States Patent
Tsai et al.

(10) Patent No.: US 12,436,643 B2
(45) Date of Patent: Oct. 7, 2025

(54) CAPACITIVE TOUCH CONTROL SYSTEM DETECTING STYLUS PEN AND FINGER

(71) Applicant: PixArt Imaging Inc., Hsin-Chu County (TW)

(72) Inventors: Ming-Hung Tsai, Hsin-Chu County (TW); Sung-Han Wu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 8 days.

(21) Appl. No.: 18/659,022

(22) Filed: May 9, 2024

(65) Prior Publication Data

US 2024/0288969 A1  Aug. 29, 2024

Related U.S. Application Data

(63) Continuation-in-part of application No. 18/224,587, filed on Jul. 21, 2023, now Pat. No. 12,216,861, which is a continuation of application No. 17/739,768, filed on May 9, 2022, now Pat. No. 11,747,939.

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC .. G06F 3/04166; G06F 3/044; G06F 3/04162; G06F 3/0442; G06F 3/0446
See application file for complete search history.

(56) References Cited

U.S. PATENT DOCUMENTS

| | | | |
|---|---|---|---|
| 2010/0155153 A1* | 6/2010 | Zachut | G06F 3/04162 178/18.03 |
| 2018/0095553 A1* | 4/2018 | Birenberg | G06F 3/03545 |
| 2018/0164909 A1* | 6/2018 | Bae | G06F 3/0442 |
| 2019/0196631 A1* | 6/2019 | Li | G06F 3/0412 |

* cited by examiner

*Primary Examiner* — Hong Zhou
(74) *Attorney, Agent, or Firm* — WPAT, PC

(57) ABSTRACT

There is provided a capacitive touch control system including a readout circuit and a touch panel. The touch panel includes multiple pixels arranged in a matrix, and is configured to operate in a first mode or a second mode. In the first mode, the touch panel time-divisionally detects a beacon frequency of a beacon symbol of the stylus pen signal within a first detection interval and performs a touch detection within a second detection interval corresponding to a beacon length interval of the beacon symbol. In the second mode, the readout circuit sequentially reads all pixel rows and pixel columns of the multiple pixels using a predetermined number of readout intervals within a positioning interval of the stylus pen signal, wherein in each of the readout intervals, each of multiple sub-circuits of the readout circuit reads one pixel row or one pixel column of the touch panel.

20 Claims, 10 Drawing Sheets

| 1st position interval Tpos1 | 2nd position interval Tpos2 | 3rd position interval Tpos3 |
|---|---|---|
| 8(interval)×8(sub-ckt) | 6(interval)×8(sub-ckt) | 4(interval)×8(sub-ckt) |
| full panel | 1st part of panel | 2nd part of panel |

FIG. 11

CAPACITIVE TOUCH CONTROL SYSTEM DETECTING STYLUS PEN AND FINGER

The present application is a continuation-in-part application of U.S. patent application Ser. No. 18/224,587 filed on Jul. 21, 2023, which is a continuation application of U.S. patent application Ser. No. 17/739,768 filed on May 9, 2022, the disclosures of which are hereby incorporated by reference herein in their entirety.

BACKGROUND

1. Field of the Disclosure

This disclosure generally relates to an interactive input system and, more particularly, to a capacitive touch control system capable of detecting a stylus pen and a finger before and after the stylus pen has been recognized.

2. Description of the Related Art

The capacitive touch panel can provide a better user experience, and thus is broadly applied to various electronic devices, e.g., applied to a display device to form a touch display device.

Please refer to FIG. 1, it is a schematic diagram of a capacitive touch control system including multiple driving circuits 11, a touch panel 12, an analog front end 13, an analog-to-digital converter (ADC) 14 and a digital backend 15. The driving circuits 11 drive the touch panel 12 with a drive signal Sd at each driving electrode, and the touch panel 12 outputs a detected signal So respectively at each sensing electrode. The driving electrodes (shown as longitudinal lines) and sensing electrodes (shown as transverse lines) of the touch panel 12 generate mutual capacitance Cm. The analog front end 13 includes an amplifier 131 and an anti-aliasing filter (AAF) 132 to amplify and filter the detected signal So. The ADC 14 converts analog signals to digital signals, which are provided to the digital backend 15 for identifying a touch position.

In capacitive touch panels nowadays, in addition to detecting the touch control of the user finger(s), the capacitive touch panels can also receive external signals from a touch pen to increase operation functions.

In the case that the external signals from a touch pen are low frequency signals (e.g., lower than 45 KHz), to allow the capacitive touch control system to be able to detect the low frequency signals, traditionally resistance of a resistor Rf in the amplifier 131 is increased and capacitance of a capacitor Cf therein is reduced such that the low frequency signals can pass a passband of the analog front end 13. However, increasing the resistance of the resistor Rf can also lead to problems of increasing a leakage voltage drop on the resistor Rf and the manufacturing cost.

Accordingly, the present disclosure provides a capacitive touch control system that is further arranged with a frequency booster in the analog front end to avoid increasing resistance of the resistor in the amplifier.

SUMMARY

The present disclosure provides a capacitive touch control system capable of detecting a stylus pen and a finger before and after the stylus pen has been recognized on a touch panel.

The present disclosure further provides a capacitive touch control system that has a better signal-to-noise ratio by dynamically adjusting a detected zone on a touch panel.

The present disclosure provides a capacitive touch control system configured to receive a stylus pen signal. The capacitive touch control system includes a touch panel. The touch panel includes multiple pixels arranged in a matrix, and is configured to time-divisionally detect a beacon frequency of a beacon symbol of the stylus pen signal within a first detection interval and perform a touch detection within a second detection interval corresponding to a beacon length interval of the beacon symbol, wherein the first detection interval is larger than a reciprocal of the beacon frequency.

The present disclosure further provides a capacitive touch control system configured to receive a stylus pen signal. The capacitive touch control system includes a touch panel and a read out circuit. The touch panel includes multiple pixels arranged in a matrix, and is configured to detect a beacon frequency of a beacon symbol of the stylus pen signal within a first positioning interval of the stylus pen signal. The readout circuit includes multiple sub-circuits, and is configured to sequentially read all pixel rows and pixel columns of the multiple pixels using a first number of first readout intervals within the first positioning interval, wherein in each of the first readout intervals, each of the multiple sub-circuits reads one pixel row or one pixel column of the touch panel.

The present disclosure further provides a capacitive touch control system configured to receive a stylus pen signal. The capacitive touch control system includes a read out circuit and a touch panel. The readout circuit includes multiple sub-circuits. The touch panel includes multiple pixels arranged in a matrix, and configured to operate in a first mode or a second mode, wherein in the first mode, the touch panel is configured to time-divisionally detect a beacon frequency of a beacon symbol of the stylus pen signal within a first detection interval and perform a touch detection within a second detection interval corresponding to a beacon length interval of the beacon symbol, and in the second mode, the readout circuit is configured to sequentially read all pixel rows and pixel columns of the multiple pixels using a first number of first readout intervals within a first positioning interval of the stylus pen signal, wherein in each of the first readout intervals, each of the multiple sub-circuits reads one pixel row or one pixel column of the touch panel.

BRIEF DESCRIPTION OF THE DRAWINGS

Other objects, advantages, and novel features of the present disclosure will become more apparent from the following detailed description when taken in conjunction with the accompanying drawings.

FIG. 11 is a schematic diagram of different detection channels and detected zones in different positioning intervals of a capacitive touch control system according to another embodiment of the present disclosure.

DETAILED DESCRIPTION OF THE EMBODIMENT

It should be noted that, wherever possible, the same reference numbers will be used throughout the drawings to refer to the same or like parts.

Figure 2:
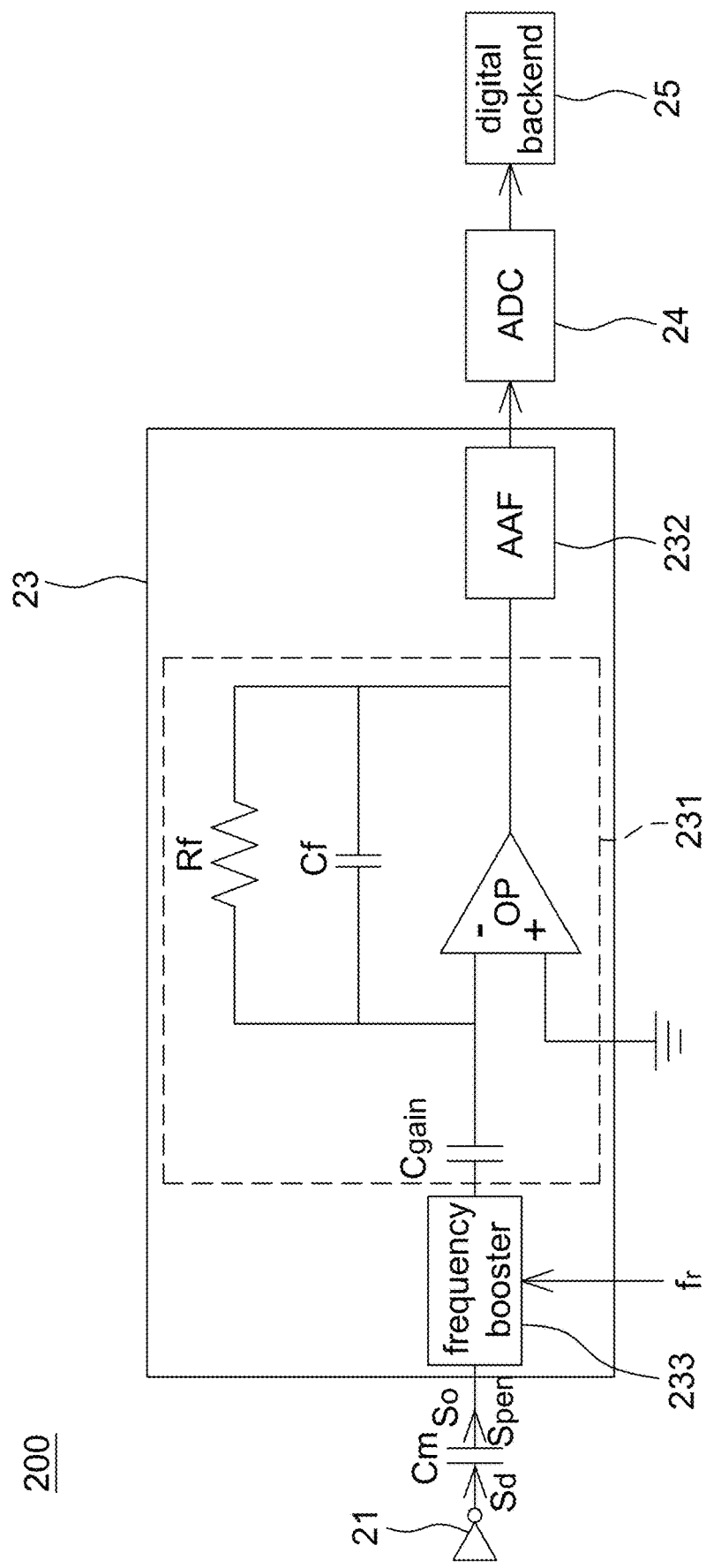
FIG. 2 is a schematic diagram of a capacitive touch control system according to an embodiment of the present disclosure.

Please refer to FIG. 2, it is a schematic block diagram of a capacitive touch control system 200 according to an embodiment of the present disclosure. The capacitive touch control system 200 includes a driving circuit 21, a capacitive touch panel (indicated by a mutual capacitor Cm), an analog front end 23, an analog-to-digital converter (ADC) 24 and a digital backend 25. In some embodiments, the ADC 24 is included in the analog front end 23.

Figure 1:
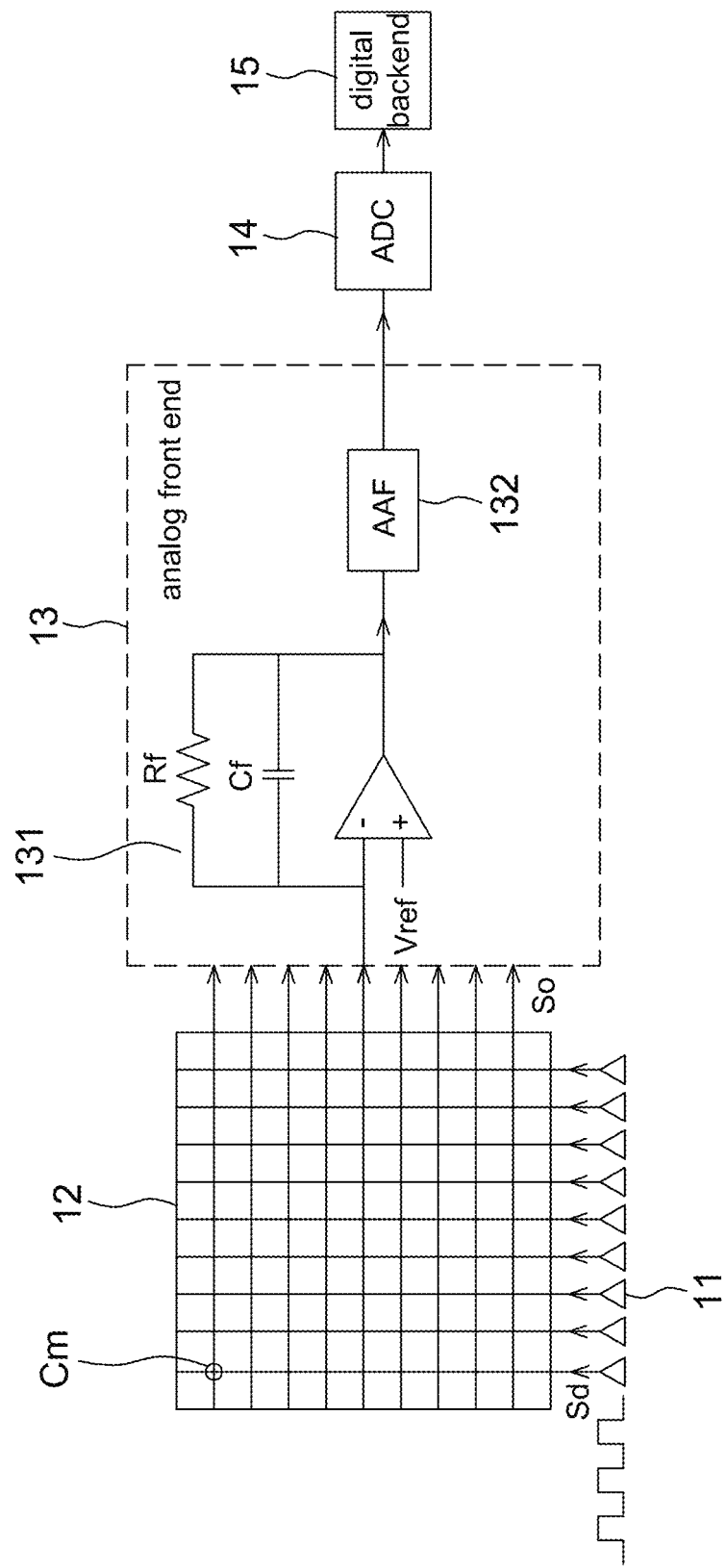
FIG. 1 is a schematic diagram of a conventional capacitive touch control system.

It should be mentioned that a capacitive touch panel (abbreviated as a touch panel hereinafter) of the capacitive touch control system 200 actually includes multiple mutual capacitors Cm and is driven by multiple driving circuits 21 as shown in FIG. 1. Each mutual capacitor Cm is formed by one driving electrode and one sensing electrode of the touch panel, which is known to the art and not a main objective of the present disclosure, and thus the touch panel is abbreviated as Cm in FIG. 2.

Furthermore, although FIG. 2 shows only one analog front end 23 coupled downstream of one sensing electrode, the capacitive touch control system 200 actually includes multiple analog front ends 23 respectively coupled to one sensing electrode, e.g., referring to U.S. patent application Ser. No. 16/703,276 filed on Dec. 4, 2019, and assigned to the same assignee of the present application, and the full disclosure of which is incorporated herein by reference. Each analog front end 23 includes an amplifier 231 and a filter (e.g., shown as anti-aliasing filter AAF, but not limited to) 232. The amplifier 231 and the filter 232 form a bandpass filter, which can also refer to the above U.S. patent application Ser. No. 16/703,276.

The amplifier 231 is, for example, an integrated programmable gain amplifier (IPGA), but not limited to. As shown in FIG. 2, the amplifier 231 includes an operational amplifier OP, a feedback resistor Rf and a compensation capacitor Cf. The feedback resistor Rf and the compensation capacitor Cf are connected between an inverting input end and an output end of the operational amplifier OP. The feedback resistor Rf and the compensation capacitor Cf are used to determine a cutoff frequency and a passband gain of the amplifier 231.

In the present disclosure, the touch panel is used to detect the user finger(s) and a touch pen or a stylus (not shown). The method of detecting the user finger(s) is known to the art, and thus details thereof are not repeated herein. If a touch pen is not approaching the touch panel, detected signals outputted by sensing electrodes of the touch panel do not contain a low frequency signal Spen of the touch pen (e.g., only containing a touch control signal So, which is associated with the drive signal Sd from the driving circuit 21). When the touch pen is approaching or in contact with the touch panel, the detected signals outputted by the sensing electrodes of the touch panel further contain the low frequency signal Spen of the touch pen (e.g., detected signal formed by So+Spen). In the present disclosure, the low frequency signal Spen has a signal frequency lower than a lower cutoff frequency of a bandpass filter formed by the analog front end 23. More specifically, the signal frequency is lower than a lower cutoff frequency of the amplifier 231.

In one aspect, a frequency of the drive signal Sd is higher than 100 KHz, and a frequency of the low frequency signal Spen is lower than 45 KHz, but not limited thereto. As mentioned above, conventionally in order to be able to detect the low frequency signal Spen, resistance of the feedback resistor Rf is increased. The present disclosure further adopts a frequency booster 233 coupled to the inverting input end of the operational amplifier OP to cause a boosted signal associated with the low frequency signal Spen to be within a bandwidth of the bandpass filter (formed by the amplifier 231 and the filter 232).

Figure 3:
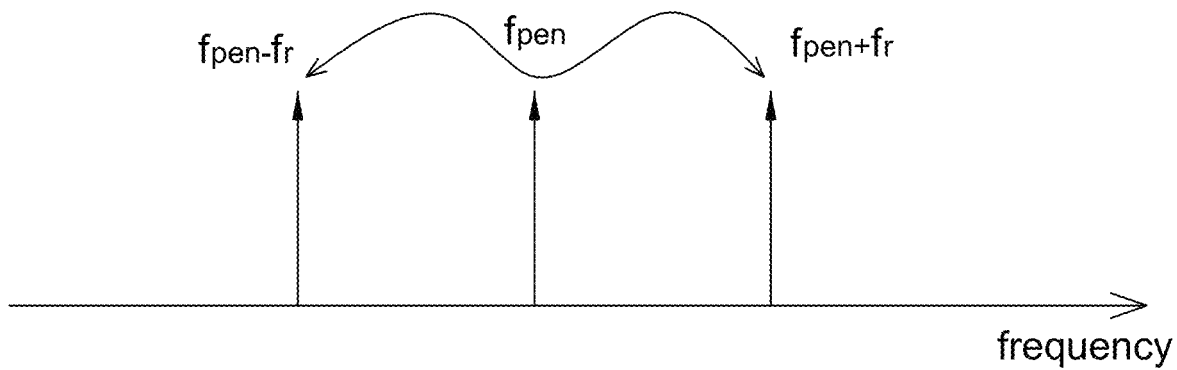
FIG. 3 is an operational schematic diagram of a frequency booster of a capacitive touch control system according to an embodiment of the present disclosure.

More specifically, the analog front end 23 receives a detected signal (e.g., including the touch control signal So or So+Spen) from the touch panel. The frequency booster 233 performs frequency boosting on the low frequency signal Spen, and it is appreciated that the touch control signal So is also frequency boosted. For example, the frequency booster 233 uses a reference frequency fr, which has a variable frequency, to boost the low frequency signal Spen. For example referring to FIG. 3, if a frequency adder is selected as the frequency booster 233, the frequency adder receives the low frequency signal Spen (having a signal frequency fpen) and the reference frequency fr, and then outputs two signals having frequencies fpen-fr and fpen+fr. Preferably, if fpen=fr, the signal having a frequency fpen-fr becomes a dc signal and is not able to pass a passband of the analog front end 23. However, even though fpen is not equal to fr, the signal having a frequency fpen-fr still has a low frequency unable to pass the passband of the analog front end 23 since fpen itself already falls out of the passband of the analog front end 23.

Figure 4:
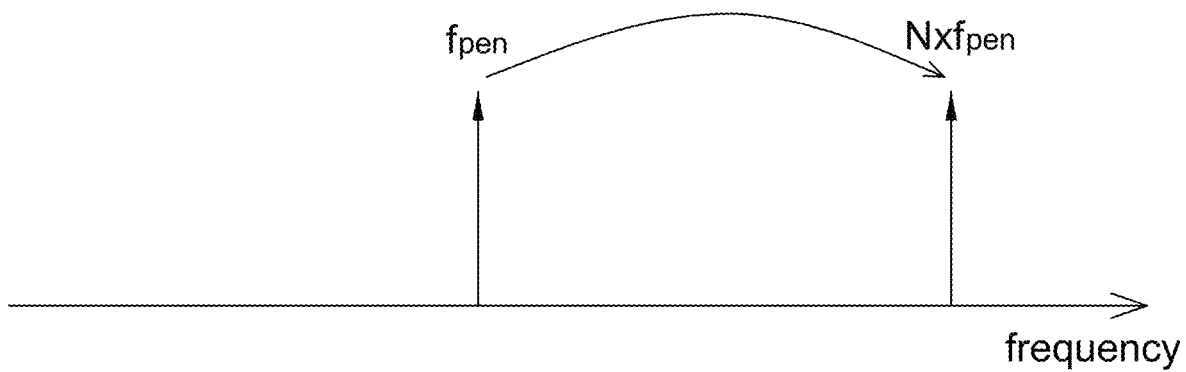
FIG. 4 is another operational schematic diagram of a frequency booster of a capacitive touch control system according to an embodiment of the present disclosure.

For example referring to FIG. 4, if a frequency mixer is selected as the frequency booster 233, the frequency mixer outputs an N-times boosted signal, shown as N×fpen. Preferably, a number of N is selected to cause N×fpen to be within the passband of the analog front end 23. For example, ×4 mixer shown in FIG. 5.8 cited in "CMOS Nanoelectronics: Analog and RF VLSI Circuit" edited by Krzysztof Iniewski can be selected as the frequency booster in the present disclosure, but the present disclosure is not limited thereto. The frequency booster 233 of the present disclosure may use other known circuits without particular limitations as long as the signal frequency fpen is boosted to be within the passband of the analog front end 23 (or higher than the lower cutoff frequency of the amplifier 231).

The amplifier 231 is coupled to the frequency booster 233 for amplifying a boosted signal outputted therefrom. The filter 232 is used to filter the boosted signal. The ADC 24 is used to convert the analog signal (i.e. amplified and filtered frequency-boosted signal) to a digital signal. The operations of the filter 232 and the ADC 24 are known to the art, e.g., also referring to the above U.S. patent application Ser. No. 16/703,276.

The digital backend 25 is used to identify whether a user finger or a touch pen is on the touch penal. In other words, the digital backend 25 is used to identify whether the touch panel outputs a low frequency signal Spen, which is sent from the touch pen. When a low frequency signal Spen is recognized, the touch panel is identified to output the low frequency signal Spen, meaning a touch pen nearby. In one aspect, the low frequency signal Spen is a frequency modulated signal, and the digital backend 25 (e.g., a processor therein) demodulates the detected signal and identifies amplitude of the low frequency signal Spen. When the amplitude exceeds a threshold, it means that the touch panel receives and outputs the low frequency signal Spen. The frequency modulation and demodulation are known to the art, and thus are not described herein.

In one aspect, the digital backend 25 further recognizes a start of the low frequency signal Spen. Please refer to FIG. 5, it shows a schematic diagram of a time pattern of the low frequency signal Spen, including a beacon symbol as a start symbol or as a flag signal of the low frequency signal Spen. Which means while a beacon symbol is occurred, the stylus is ready to emit the low frequency signal Spen. The beacon symbol has a length Td_0 and a frequency fpen_0. The digital backend 25 recognizes the beacon symbol according to the length Td_0 and the frequency fpen_0 thereof, and confirms a touch pen appearing on the touch panel and performs the synchronization according to the beacon symbol. In one aspect, even though the digital backend 25 identifies that the demodulated low frequency signal Spen has amplitude larger than a predetermined threshold, the touch pen is not identified appearing (i.e. not performing corresponding control) until the beacon symbol is recognized. That is, appearance of the touch pen is confirmed after the beacon symbol is recognized and then the corresponding control is executed.

Furthermore, the low frequency signal Spen further includes multiple function symbols (e.g., shown as Fun I to Fun V) corresponding to multiple functions of the touch pen, e.g., hovering, eraser, ink or the like, but not limited to. The multiple functions respectively include a length (e.g., shown as Td_1 to Td_5) and a frequency (e.g., shown as fpen_1 to fpen_5). At least one of the multiple lengths and the multiple frequencies of the multiple function symbols are different from one another for distinguishing different function symbols. That is, the pairs (Td_1, fpen_1), (Td_2, fpen_2), (Td_3, fpen_3), (Td_4, fpen_4), and (Td_5, fpen_5) are not all the same. At least one of the length and the frequency of the beacon symbol is different from the multiple lengths and the multiple frequencies of the multiple function symbols for distinguishing the beacon symbol. That is, at least one of (Td_0, fpen_0) is different from (Td_1, fpen_1), (Td_2, fpen_2), (Td_3, fpen_3), (Td_4, fpen_4), and (Td_5, fpen_5).

Because the low frequency signal Spen includes various signal frequencies, to optimize the boosting performance, the reference frequency fr inputted into the frequency booster 233 changes corresponding to the beacon symbol and the multiple function symbols, e.g., controlled by the digital backend 25 or by an additional frequency control circuit arranged in the analog front end 23.

For example, if a frequency adder is used as the frequency booster 233, corresponding to the beacon symbol, the reference frequency fr=fpen_0; corresponding to the function symbol Fun I, the reference frequency fr=fpen_1; and so on.

In another aspect, the reference frequency fr is always kept identical, e.g., equal to fpen_0 or another predetermined constant value.

Figure 5:
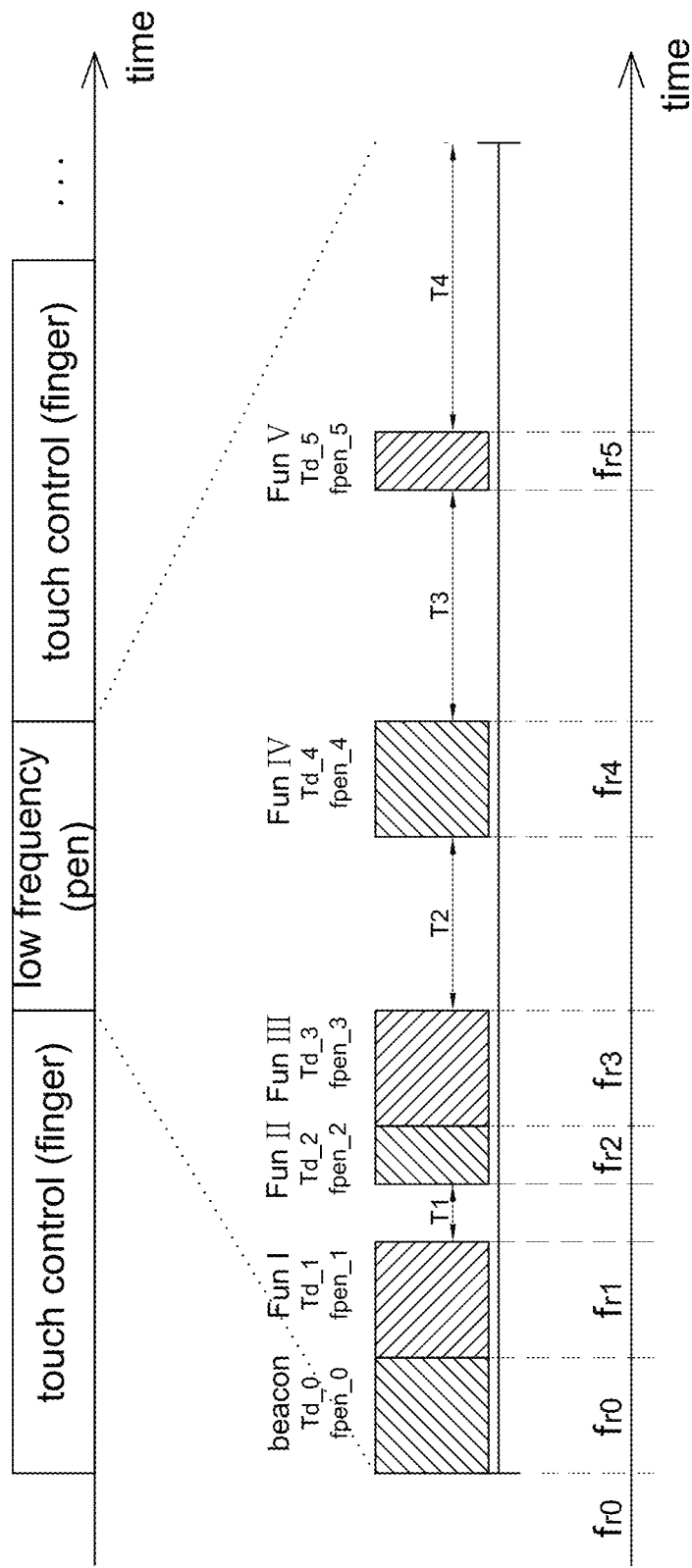
FIG. 5 is a schematic diagram of an operating method of a capacitive touch control system according to an embodiment of the present disclosure.

In one aspect, when the digital backend 25 identifies that there is a user finger on the touch panel (or the touch panel not outputting the low frequency signal Spen or before recognizing a beacon symbol of the low frequency signal Spen outputted by the touch pen), e.g., an interval of "touch control" shown in FIG. 5, the reference frequency fr is controlled as a constant value, which is equal to, for example, the frequency fpen_0 of the beacon symbol or equal to a frequency used by the frequency booster 233 in boosting the frequency fpen_0 of the beacon symbol. When the digital backend 25 identifies that there is a touch pen on the touch panel (or the touch panel outputting the low frequency signal Spen or recognizing the beacon symbol of the low frequency signal Spen outputted by the touch pen), the reference frequency fr is controlled to be variable, which is sequentially arranged to be equal to the frequency fpen_1 to the frequency fpen_5, or equal to a frequency used by the frequency booster 233 in boosting the frequency fpen_1 to the frequency fpen_5, sequentially. It should be mentioned that the time pattern of the low frequency signal Spen is not limited to that shown in FIG. 5, and is determined according to actual applications.

If there are blank intervals (i.e. not including any symbol) between the multiple function symbols, e.g., T1 to T4 shown in FIG. 5, the digital backend 25 is arranged to perform the touch control detection within the blank intervals T1 to T4, i.e. identifying whether there is a user finger on the touch panel. In different blank intervals T1 to T4, the reference frequency fr is set as a constant value or to be variable. For example, the reference frequency fr is set as the frequency fpen_0 of the beacon symbol; or, the reference frequency fr is set to be equal to a frequency of a previous function symbol. For example, in the blank interval T1, the reference frequency fr is set as the frequency fpen_1; in the blank interval T2, the reference frequency fr is set as the frequency fpen_2; and so on.

Furthermore, in the aspect that the frequency booster 233 is not able to directly boost the signal frequency fpen to a range of the passband of the bandpass filter, the analog front end 23 further includes a gain capacitor Cgain coupled between the frequency booster 233 and the inverting input end of the operational amplifier OP, and capacitance of the gain capacitor Cgain is smaller than capacitance of the compensation capacitor Cf.

In the present disclosure, preferably the capacitive touch control system previously records the time pattern of a low frequency signal Spen such that after a beacon symbol of the low frequency signal Spen is recognized, the reference frequency fr is adjusted corresponding to different symbols according to the recorded time pattern.

The present disclosure further provides a capacitive touch control system that performs the touch detection (e.g., detecting a finger) and the stylus pen detection in different time intervals before and after a stylus pen is detected. For example referring to FIG. 7, a recognition mode is shown before the stylus pen is detected, and a stylus mode is shown after the stylus pen is detected Please refer to FIG. 6, it is a schematic diagram of a capacitive touch control system 600 according to another embodiment of the present disclosure. The capacitive touch control system 600 includes a touch panel 61, a row decoder 621, a column decoder 622, a driving circuit 63, a readout circuit 64 and a digital backend 65, wherein the digital backend 65 includes a touch sensor for identifying whether a finger and/or a stylus pen 90 appears on the touch panel 61. In this embodiment, the readout circuit 64 includes multiple sub-circuits, e.g., shown as circuits I to VIII, to respectively read pixel data of at least one pixel row or at least one pixel column. The readout circuit 64 is arranged in, for example, the analog front end mentioned above.

The row decoder 621 and the column decoder 622 are used to output control signals (e.g., including row selection signals, column selection signals, reading signals) to control pixels of the touch panel 61 to be activated or read, e.g., the touch panel 61 further including multiple switching devices (e.g., transistor switches, but not limited to) to be turned on/off by the control signals of the row decoder 621 and the column decoder 622. Details of the touch panel 61 operating according to the control signals of the row decoder 621 and the column decoder 622 are known to the art and not a main objective of the present disclosure, and thus details thereof are not described herein. It is appreciated that the position detection and data readout of the touch panel 61 mentioned below are performed according to the control signals of the row decoder 621 and the column decoder 622.

Figure 6:
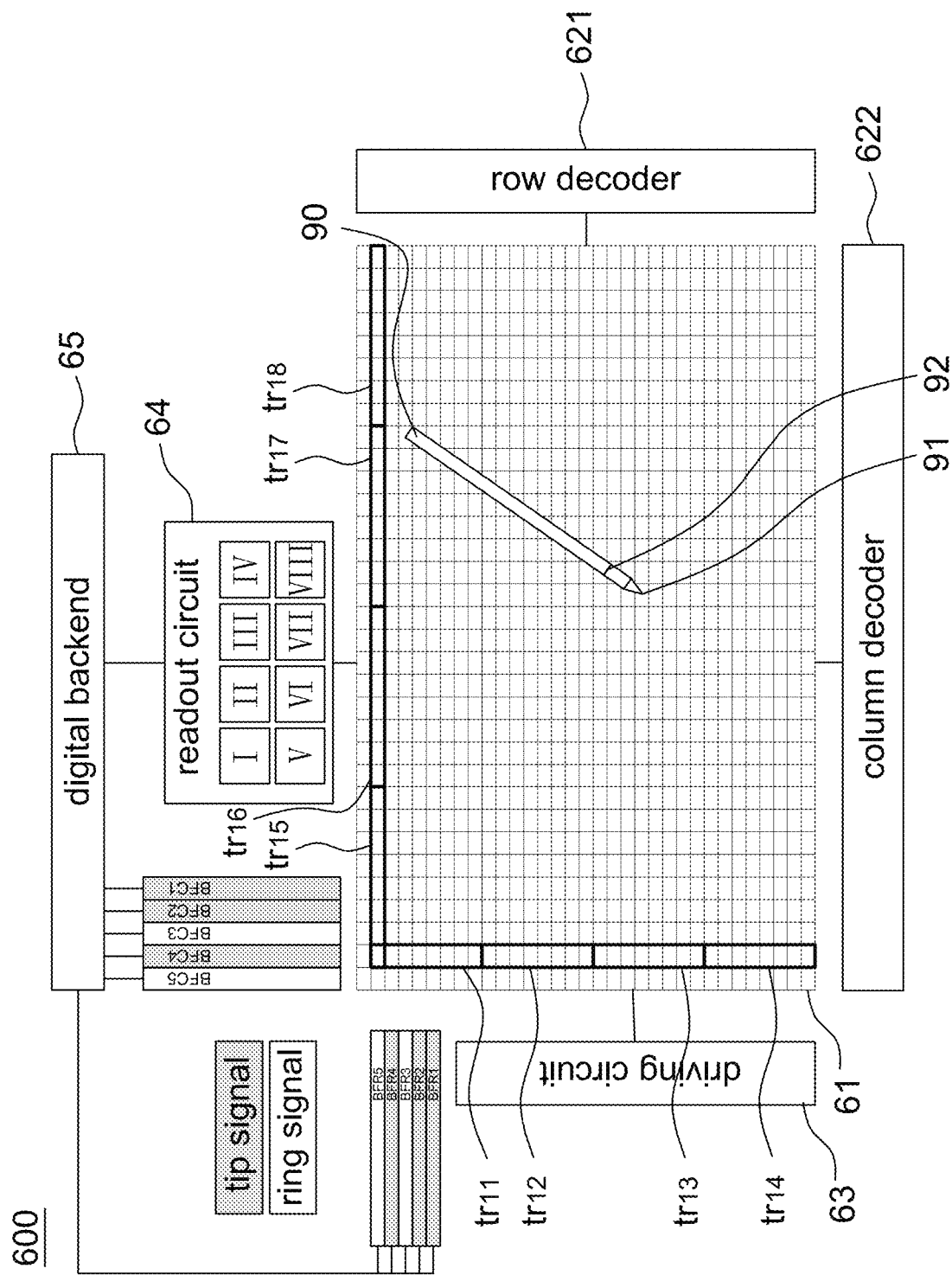
FIG. 6 is a schematic diagram of a capacitive touch control system according to another embodiment of the present disclosure.
Figure 8:
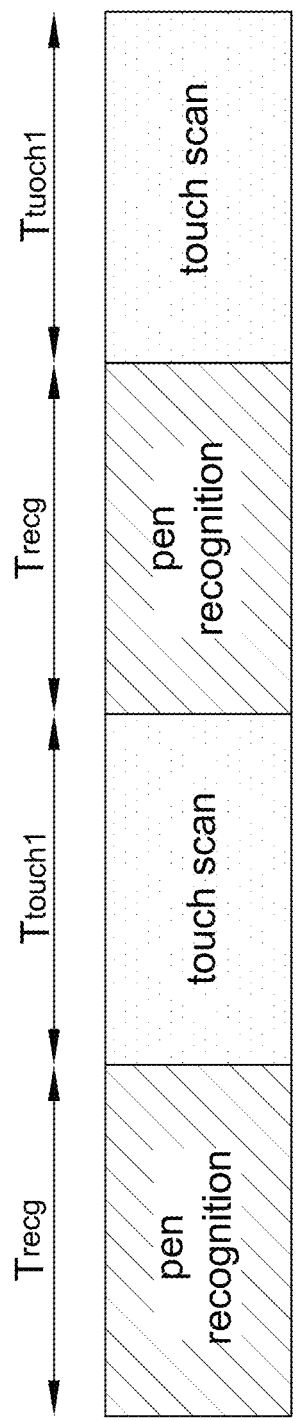
FIG. 8 is a schematic diagram of performing stylus pen recognition and touch scan in different time intervals in a recognition mode in FIG. 7.

The touch panel 61 is, for example, a capacitive touch panel, which includes multiple pixels arranged in a matrix as shown in FIG. 6. In one aspect, the touch panel 61 detects a stylus pen 90 using a self-capacitive mode (e.g., a first detection interval $T_{recg}$ shown in FIG. 8). In the first detection interval $T_{recg}$, the touch panel 61 is mainly used to receive a stylus pen signal (e.g., including the low frequency signal Spen mentioned above) shown in FIG. 10 from the stylus pen 90, and the driving circuit 63 does not output drive signals (e.g., Sd mentioned above) to the touch panel 61.

Figure 10:
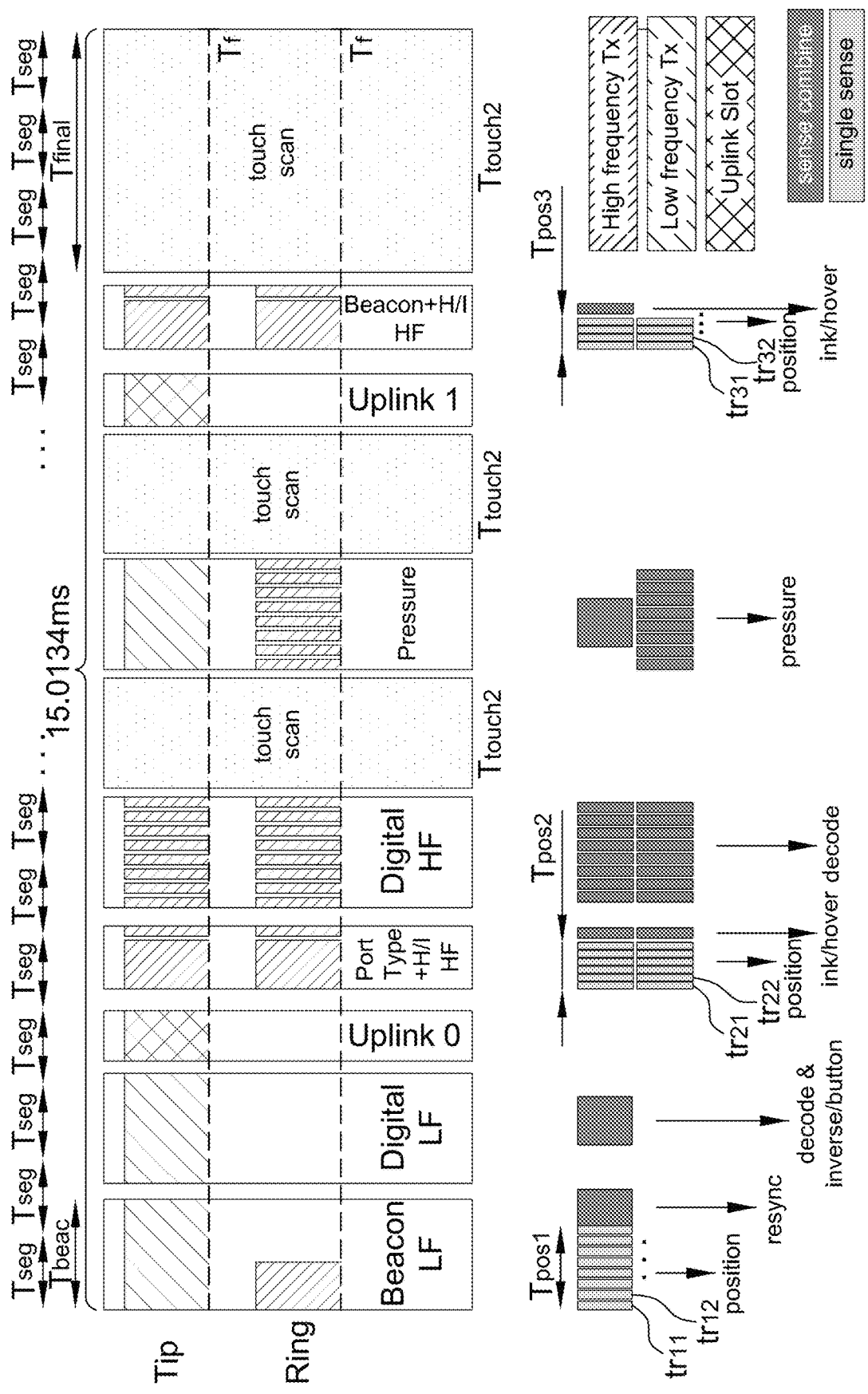
FIG. 10 is a schematic diagram of a stylus pen signal to be detected by a capacitive touch control system according to another embodiment of the present disclosure.

In FIG. 10, signals contained in "Tip" include the signal pattern generated by a tip of the stylus pen 90, and signals contained in "Ring" include the signal pattern generated by a ring of the stylus pen 90. The time intervals "Tpos1", "Tpos2" and "Tpos3" are intervals for identifying positions of the tip and the ring of the stylus pen 90 in the stylus mode. The time interval "Tbeac" is referred to a time interval of a beacon signal, and the time interval "Tfinal" is referred to a final interval of the stylus pen signal. The "Uplink 0" and "Uplink 1" are intervals for communicating packets from the touch panel 61 to the stylus pen 90. The terms "position", "resync", "decode", "inverse/button", "ink/hover" and "pressure" are functions in the corresponding time intervals.

In addition, in one embodiment since it is only required to identify whether the stylus pen signal appears on the touch panel 61 or not, in the first detection interval $T_{recg}$ the readout circuit 63 reads only all pixel rows or only all pixel columns of the touch panel 61 without reading detected results from all the pixel rows and pixel columns, but the present disclosure is not limited thereto. Meanwhile, the sub-circuits I to VIII of the readout circuit 64 are arranged to be able to read multiple pixel rows or multiple pixel columns at the same time (e.g., by controlling conducted switching devices), and are not limited to read only one pixel row or only one pixel column at a time.

In one aspect, the touch panel 61 performs the touch scanning (e.g., a second detection interval $T_{touch1}$ in FIGS. 8-9 and $T_{touch2}$ in FIG. 10) using a mutual-capacitive mode. That is, in the touch scan intervals $T_{touch1}$ and $T_{touch2}$, one of the pixels rows and the pixel columns are used as driving lines (Tx) and the other one of the pixels rows and the pixel columns are used as receiving lines (Rx). In the touch scan intervals $T_{touch1}$ and $T_{touch2}$, the driving circuit 63 outputs drive signals to the touch panel 61 to perform the touch scanning according to parameters (e.g., including the voltage, charging/discharging time) of the pixel capacitance changed by a conductor (e.g., a finger). The conductor herein is referred to an object not generating any electrical signal to the touch panel 61.

Please refer to FIG. 7 again, the touch panel 61 may operate in a first mode or a second mode, wherein the first mode is referred to a mode for recognizing whether the stylus pen 90 appears on the touch panel 61 or not, and the second mode is referred to a mode to be entered after the stylus pen 90 appears on the touch panel 61, i.e. a mode for controlling a computer device equipped with the touch panel 61 using the stylus pen 90. In the present disclosure, both the first mode and the second mode also detect a finger, e.g., respectively within $T_{touch1}$ and $T_{touch2}$.

Figure 7:
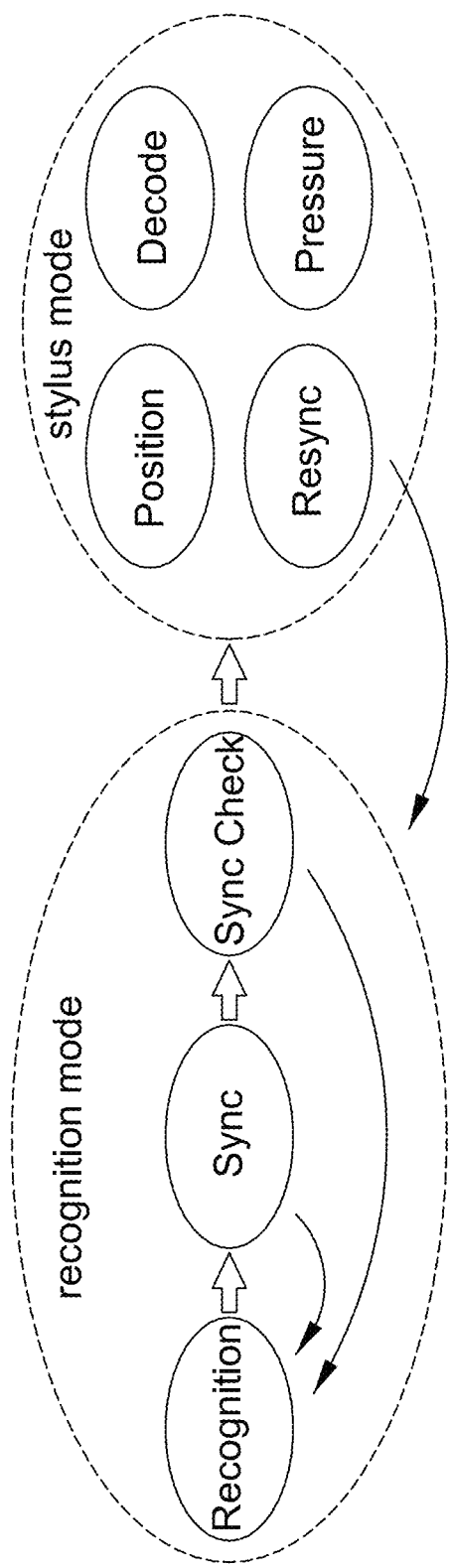
FIG. 7 is a schematic diagram of two operation modes of a capacitive touch control system according to another embodiment of the present disclosure.

As shown in FIG. 7, in the first mode (i.e. recognition mode), the digital backend 65 respectively performs a recognition step, a sync step and a sync check step. Please refer to FIG. 10 together, it is a time pattern of a stylus pen signal based on Microsoft Pen Protocol (MPP) 2.0. It should be mentioned that although the present disclosure is described by using MMP 2.0 as an example, the present disclosure is not limited thereto. In FIG. 10, the single sense is to detect a position of the stylus pen 90, and the sense combine is to detect other functions instead of detecting the position.

In the recognition step of FIG. 7, the touch panel 61 time-divisionally detects a beacon frequency (e.g., 25006.84 Hz) of a beacon symbol of a stylus pen signal (e.g., shown as Beacon LF) within a first detection interval $T_{recg}$ (e.g., referring to FIGS. 8 and 9) and performs a touch detection within a second detection interval $T_{touch1}$ (e.g., referring to FIGS. 8 and 9) repeatedly (as shown in FIG. 10) in order to have an overlap with a beacon length interval (e.g., shown as $T_{beac}$=1281.633 μs, e.g., shown as 1280 μs for abbreviation) of the beacon symbol because the touch panel 61 does not know a start time of the stylus pen signal having about 15 ms length shown in FIG. 10. When an overlap occurs, the touch panel 61 is able to receive the beacon signal of the stylus pen 90. If the overlap does not occur, the touch panel 61 is able to detect the stylus pen 90 and finger(s) separately. In one aspect, the first detection interval $T_{recg}$ is selected to be smaller than (the beacon length interval $T_{beac}$-a minimum sync time $T_{sync}$)/2 and is selected to be larger than a reciprocal of the beacon frequency (e.g., 1/25006.84, close to 40 μs).

Figure 9:
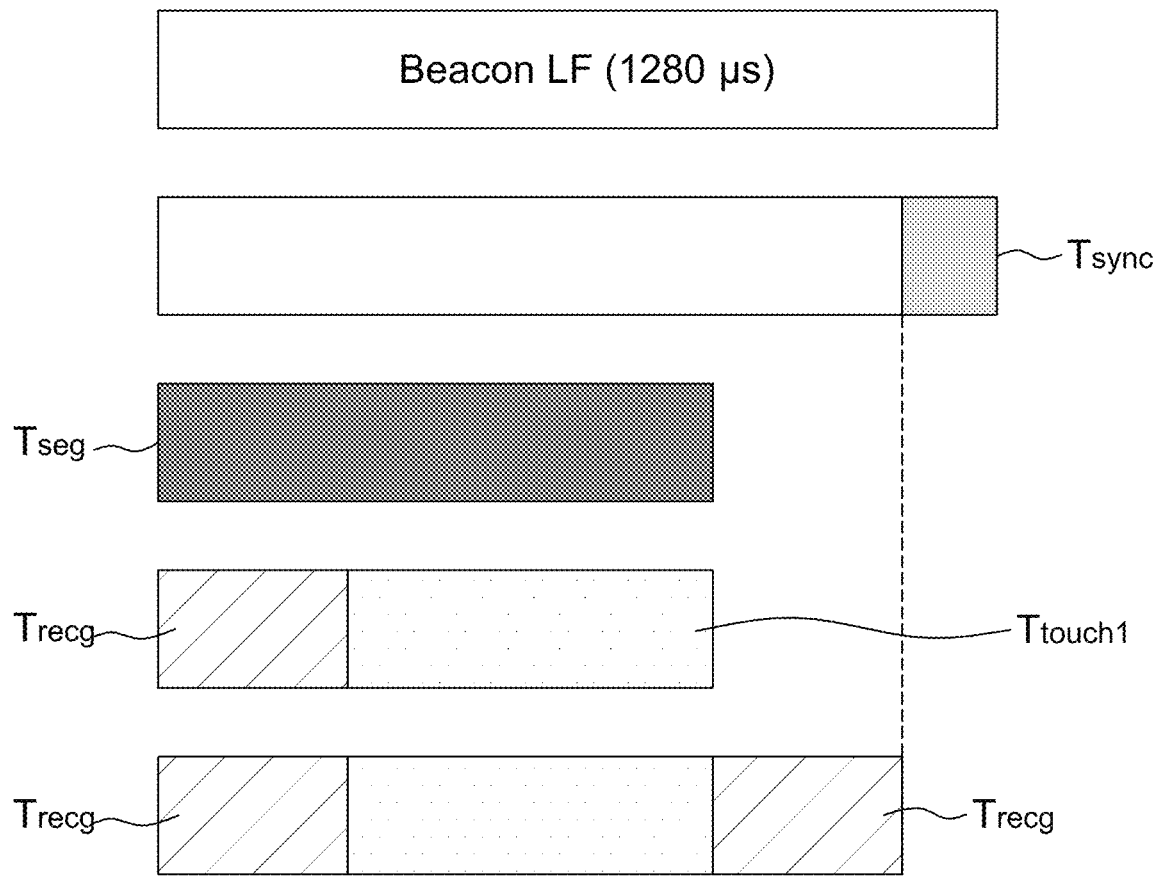
FIG. 9 is a schematic diagram of detection intervals of performing the stylus pen recognition and the touch scan in FIG. 8.

As shown FIG. 9, the minimum sync time $T_{sync}$ is, for example, 80 μs. The touch panel 61 is arranged to perform at least one beacon frequency (or symbol) detection and one touch detection within each time segment $T_{seg}$, wherein $T_{seg}=T_{beac}-T_{sync}-T_{recg}$, indicating a time interval for performing the beacon frequency (or symbol) detections. For example in one aspect, the first detection interval $T_{recg}$ is arranged to be between 40 μs and 560 μs, and is preferably a multiple of 40 μs.

The method for identifying whether the stylus pen signal is recognized or not is arranged that the digital backend 65 identifies whether a beacon signal magnitude of the beacon frequency is larger than a predetermined threshold or not. If it is assumed that the touch panel 61 includes 32×32 pixels, in a first detection interval $T_{recg}$, the circuit I simultaneously connects to multiple (e.g., 8, but not limited to) pixel rows and/or pixel columns to readout a first signal summation thereof for the digital backend 65 to identify whether the beacon frequency is contained in the first signal summation or not; the circuit II simultaneously connects to another multiple (e.g., 8, but not limited to) pixel rows and/or pixel columns to readout a second signal summation thereof for the digital backend 65 to identify whether the beacon frequency is contained in the second signal summation or not; the circuit III simultaneously connects to another multiple (e.g., 8, but not limited to) pixel rows and/or pixel columns to readout a third signal summation thereof for the digital backend 65 to identify whether the beacon frequency is contained in the third signal summation or not; and the circuit IV simultaneously connects to another multiple (e.g., 8, but not limited to) pixel rows and/or pixel columns to readout a fourth signal summation thereof for the digital backend 65 to identify whether the beacon frequency is contained in the fourth signal summation or not. In this way, only four sub-pixels of the readout 64 are used (without using all sub-circuits, e.g., without using V to VIII) and the whole touch panel 61 is covered.

While identifying a beacon signal magnitude of the beacon frequency is larger than or equal to a predetermined threshold, it means that the stylus pen 90 may appear on the touch panel 61 and thus the digital backend 65 controls the touch panel 61 not to enter the second detection interval $T_{touch1}$ to perform the touch detection, but to continuously perform the rest steps of the first mode as shown in FIG. 7, i.e. sync and sync check steps.

To improve the identification accuracy, the digital backend 65 further compares a beacon signal magnitude of the beacon frequency with a function signal magnitude of the frequency (e.g., the stylus pen 90 generating different frequencies corresponding to different functions) of other function symbols (e.g., decode, pressure, ink, hover as shown in FIG. 10) to determine whether to enter the second detection interval $T_{touch1}$. For example, when the beacon signal magnitude of the beacon frequency is identified to be larger than the function signal magnitude of other function symbols by 1.5 times (but not limited to 1.5 times, e.g., determined according to the signal-to-noise ratio), it is considered that the stylus pen 90 may appear on the touch panel 61. The second detection interval $T_{touch1}$ is not entered when the stylus pen 90 is considered to appear on the touch panel 61.

Next, in the sync step, the digital backend 65 recognizes an end of the beacon symbol within the beacon length interval $T_{beac}$, and the code of the beacon symbol is preferably recorded in the digital backend 65 previously for the recognition.

Finally, in the sync check step, the digital backend 65 identifies whether the beacon frequency is detected at the final interval (e.g., shown as $T_{final}$ in FIG. 10) of a total interval of the stylus pen signal. The total interval of the stylus pen signal (e.g., shown as 15.0134 ms, but not limited to) is preferably known by the digital backend 65, and thus the $T_{final}$ is also known.

When the end of the beacon symbol is recognized and the beacon frequency is not detected in the final interval $T_{final}$ (i.e. fulfilled), the digital backend 65 enters the stylus mode (i.e. the second mode). As shown in FIG. 7, when the sync step or the sync check step is not fulfilled, the recognition step is returned again to re-recognize energy of the beacon frequency.

In this embodiment, when the capacitive touch control system 600 enters the second mode (stylus mode), a position of the stylus pen signal (i.e. position of the stylus pen 90) is identified within multiple positing intervals (e.g., shown as $T_{pos1}$, $T_{pos2}$ and $T_{pos3}$ in FIG. 10), and the conductor(s) is detected within multiple touch scan intervals $T_{touch2}$.

In the first positioning interval $T_{pos1}$ of the stylus pen signal as shown in FIG. 10, the touch panel 61 detects an appearing position of the beacon frequency of the beacon symbol (e.g., shown as Beacon LF). The readout circuit 65 sequentially reads all pixel rows and pixel columns of the multiple pixels of the touch panel 61 using a first number (e.g., shown as 8 in FIG. 10) of first readout intervals $tr_{11}$, $tr_{12}$ . . . (e.g., respectively 80 μs to 160 μs within the first positioning interval $T_{pos1}$, wherein in each of the first readout intervals $tr_{11}$, $tr_{12}$ . . . , each of the multiple sub-circuits (e.g., I to VIII) reads one pixel row or one pixel column of the touch panel 61. Referring to FIG. 6 again, for example in a first phase of the first readout interval $tr_{11}$, the sub-circuits I to VIII respectively reads pixel data from the first pixel row to the eighth pixel row; in a second phase of the first readout interval $tr_{12}$, the sub-circuits I to VIII respectively reads pixel data from the ninth pixel row to the sixteenth pixel row; . . . ; in a seventh phase of the first readout interval $tr_{17}$, the sub-circuits I to VIII respectively reads pixel data from the seventeenth pixel column to the twenty-fourth pixel column; in an eighth phase of the first readout interval $tr_{18}$, the sub-circuits I to VIII respectively reads pixel data from the twenty-fifth pixel column to the thirty-second pixel column. After these eight first readout intervals $tr_{11}$ to $tr_{18}$, 64 channels of the touch panel 61 (i.e., a number of rows plus a number of columns is 64) are all read. It is appreciated that when a number of channels of the touch panel 61 is different (i.e. having different size), a number of the first readout intervals is not equal to 8.

In the second positioning interval $T_{pos2}$ of the stylus pen signal, the touch panel 61 further detects a first frequency of a first signal source (e.g., tip 91) and a second frequency of a second signal source (e.g., ring 92) of the stylus pen 90. The readout circuit 65 further sequentially reads a first part of pixel rows and pixel columns of the multiple pixels of the touch panel 61 using a second number (e.g., shown as 6 in FIG. 10) of second readout intervals $tr_{21}$, $tr_{22}$ . . . (e.g., respectively 73.33 μs) within the second positioning interval $T_{pos2}$, wherein the second number is described to be smaller than the first number (e.g., 6<10) in this embodiment as an example, but the second number is not necessary to be smaller than the first number in the present disclosure. In one aspect, the first part of pixel rows and pixel columns is determined according to a first position of the stylus pen signal determined in the first positioning interval $T_{pos1}$. The first position is, for example, a pixel position determined by one pixel row and one pixel column receiving the maximum beacon signal magnitude of the beacon symbol, or a gravity center position of multiple pixel rows and multiple pixel columns receiving the maximum beacon signal magnitude, wherein the pixel position or the gravity center position is recorded in the buffers BER1 and BFC1. For example, the pixel rows and pixel columns farthest from the first position of the stylus pen signal are not scanned/read in the second positioning interval $T_{pos2}$. For example, when the first position is located at the right-lower corner of the touch panel 61 in FIG. 6, the pixel rows and pixel columns associated with the first readout intervals $tr_{11}$ and $tr_{15}$ are not scanned/read again, e.g., only 48 channels are read via readout intervals $tr_{12}$ to $tr_{14}$ and $tr_{16}$ to $tr_{18}$ in the second positioning interval $T_{pos2}$ as show in FIG. 11. In this way, the length of each of the second positioning interval $tr_{21}$, $tr_{22}$ . . . may be extended so as to improve the signal-to-noise ratio. For example, the pixel rows read in $tr_{21}$ is identical to those read in $tr_{12}$; the pixel rows read in $tr_{22}$ is identical to those read in $tr_{13}$; the pixel rows read in $tr_{23}$ is identical to those read in $tr_{14}$; the pixel columns read in $tr_{24}$ is identical to those read in $tr_{16}$; the pixel columns read in $tr_{25}$ is identical to those read in $tr_{17}$; the pixel columns read in $tr_{26}$ is identical to those read in $tr_{18}$.

In one aspect, the first frequency is 161363.64 Hz, 205357.14 Hz or 196428.57 Hz to correspond to different functions. In one aspect, the second frequency is 175000 Hz, 178571.43 Hz or 169642.86 Hz to correspond to different functions.

In the third positioning interval $T_{pos3}$ of the stylus pen signal, the touch panel 61 further detects a third frequency of the first signal source and a fourth frequency of the second signal source of the stylus pen 90. The readout circuit 65 further sequentially reads a second part of pixel rows and pixel columns of the multiple pixels of the touch panel 61 using a third number (e.g., shown as 4 in FIG. 10) of third readout intervals $tr_{31}$, $tr_{32}$ . . . (e.g., respectively 110 μs) within the third positioning interval $T_{pos3}$, wherein the third number is described to be smaller than the second number (e.g., 4<6) in this embodiment as an example, but the third number is not necessary to be smaller than the second number in the present disclosure. In one aspect, the second part of pixel rows and pixel columns is determined according to a second position of the stylus pen signal determined in the second positioning interval $T_{pos2}$. The second position includes a position associated with the first signal source and a position associated with the second signal source. The position associated with the first signal source is, for example, a pixel position determined by one pixel row and one pixel column receiving the maximum signal magnitude of the first frequency, or a gravity center position of multiple pixel rows and multiple pixel columns receiving a maximum signal magnitude, wherein the pixel position or the gravity center position is recorded in the buffers BFR2 and BFC2. The position associated with the second signal source is, for example, a pixel position determined by one pixel row and one pixel column receiving a maximum signal magnitude of the second frequency, or a gravity center position of multiple pixel rows and multiple pixel columns receiving the maximum signal magnitude, wherein the pixel position or the gravity center position is recorded in the buffers BFR3 and BFC3. For example, the pixel rows and pixel columns farthest from the first position (or the second position) of the stylus pen signal are not scanned/read in the third positioning interval $T_{pos3}$. For example, when the first position (or the second position) is located at the right-lower corner of the touch panel 61 in FIG. 6, the pixel rows and pixel columns associated with the first readout intervals $tr_{12}$ and $tr_{16}$ (or the second readout intervals $tr_{21}$ and $tr_{24}$) are not scanned/read again, e.g., only 32 channels are read in the third positioning interval $T_{pos3}$ as show in FIG. 11. In this way, the length of each of the third positioning interval $tr_{31}$, $tr_{32}$ . . . may be extended so as to improve the signal-to-noise ratio. For example, the pixel rows read in $tr_{31}$ is identical to those read in $tr_{13}$; the pixel rows read in $tr_{32}$ is identical to those read in $tr_{14}$; the pixel rows read in $tr_{33}$ is identical to those read in $tr_{17}$; the pixel columns read in $tr_{34}$ is identical to those read in $tr_{18}$.

The digital backend 65 determines a third position of the stylus pen 90 in a third positioning interval $T_{pos3}$. The third position includes a position associated with the first signal source and a position associated with the second signal source. For example, the position associated with the first signal source is a pixel position determined by one pixel row and one pixel column receiving a maximum signal magnitude of the third frequency, or a gravity center position of multiple pixel rows and multiple pixel columns receiving the maximum signal magnitude, wherein the pixel position or the gravity center position is recorded in the buffers BFR4 and BFC4. For example, the position associated with the second signal source is a pixel position determined by one pixel row and one pixel column receiving the maximum signal magnitude of the fourth frequency, or a gravity center position of multiple pixel rows and multiple pixel columns receiving the maximum signal magnitude, wherein the pixel position or the gravity center position is recorded in the buffers BFR5 and BFC5.

The position information stored in the buffers BFR1 to BFR5 and BFC1 to BFC5 is accessed by the digital backend 65, and functions thereof are determined according to different applications. In another aspect, the capacitive touch control system 600 includes only the buffers BFR1 to BFR3 and BFC1 to BFC3, wherein the buffers BFR1 and BEC1 are used to store, for example, information associated with the first position, and the buffers BFR2 to BFR3 and BFC2 to BFC3 are used to sequentially store, for example, information associated with the second position and the third position.

In one aspect, the third frequency is 165909.09 Hz, 205357.14 Hz or 196428.57 Hz to correspond to different functions. In one aspect, the fourth frequency is 175000 Hz, 178571.43 Hz or 169642.86 Hz to correspond to different functions.

In addition, the readout circuit 64 of the present disclosure is not limited to reduce the number of pixel rows and pixel columns to be scanned/read in the second positioning interval $T_{pos2}$ and the third positioning interval $T_{pos3}$, and is further arranged to determine the pixel rows and pixel columns to be scanned/read in reading other function symbols (e.g., decode, pressure) according to at least a position of the stylus pen 90 obtained in a previous positioning interval, which are similar to the method of determining the number of pixel rows and pixel columns to be scanned/read in the second positioning interval $T_{pos2}$ and the third positioning interval $T_{pos3}$ mentioned above and thus details thereof are described herein.

In addition, the capacitive touch control system 600 may further perform the touch scan (e.g., detecting finger) within a blank interval between function symbols (e.g., shown as $T_{touch2}$ and $T_{final}$ in FIG. 10, and T1 to T4 in FIG. 5). As mentioned above, in detecting the stylus pen signal, the capacitive touch control system 600 is operated in a self-capacitive mode, i.e. the driving circuit 63 not outputting any drive signal to the touch panel 61; whereas in detecting a finger, the capacitive touch control system 600 is operated in a mutual-capacitive mode, i.e. the driving circuit 63 outputting the drive signals to the touch panel 61.

It should be mentioned that although the above embodiments are described in the way that the readout circuit 64 includes 8 sets of sub-circuits I to VIII to read the stylus pen signal, the present disclosure is not limited thereto. In other embodiments, other numbers of sub-circuits are arranged in the readout circuit 64, or only a part of sub-circuits are used to read the position information according to different applications. That is, different numbers of sub-circuits are used to read the stylus pen signal from the stylus pen 90 received by the touch panel 61 according to different operations. In the present disclosure, one sub-circuit is referred to a circuit for reading out data of one or more sensing cells of the touch panel 61.

It should be mentioned that the values, including pixel numbers, time intervals, readout interval numbers and frequencies, are only intended to illustrate but not to limit the present disclosure. These values are different according to different applications, e.g., different pen protocols.

As mentioned above, in conventional capacitive touch control systems, in order to detect low frequency signals, resistance of a resistor in an amplifier for amplifying detected signals is increased such that the manufacturing cost increased and the leakage voltage can also be increased.

Accordingly, the present disclosure further provides a capacitive touch control system (e.g., FIG. 2) that is further arranged with a frequency booster in an analog front end thereof such that a large resistor is not required in the amplifier to allow low frequency signals to go through a passband of the analog front end. Furthermore, the objective of optimizing the frequency boosting is achieved by dynamically adjusting a reference frequency inputted to the frequency booster.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A capacitive touch control system, configured to receive a stylus pen signal, the capacitive touch control system comprising:
    a touch panel, comprising multiple pixels arranged in a matrix, and configured to time-divisionally detect a beacon frequency of a beacon symbol of the stylus pen signal within a first detection interval and perform a touch detection within a second detection interval within a beacon length interval of the beacon symbol, wherein
    the first detection interval is larger than a reciprocal of the beacon frequency.

2. The capacitive touch control system as claimed in claim 1, wherein the first detection interval is smaller than (the beacon length interval-a minimum sync time)/2,
    the beacon length interval is 1281.633 μs,
    the minimum sync time is 80 μs, and
    the beacon frequency is 25006.84 Hz.

3. The capacitive touch control system as claimed in claim 1, further comprising a readout circuit, wherein
    within the first detection interval, the readout circuit is configured to read multiple pixel rows only or multiple pixel columns only of the touch panel.

4. The capacitive touch control system as claimed in claim 3, further comprising a digital backend, wherein
    the digital backend is coupled to the readout circuit, and configured to control the touch panel not to enter the second detection interval to perform the touch detection upon identifying a beacon signal magnitude of the beacon frequency being larger than a predetermined threshold.

5. The capacitive touch control system as claimed in claim 4, wherein the digital backend is further configured to
    recognize an end of the beacon symbol within the beacon length interval,
    identify whether the beacon frequency is detected within a final interval among a whole interval of the stylus pen signal, and
    enter a stylus mode upon the end of the beacon symbol is recognized and the beacon frequency is not detected in the final interval.

6. The capacitive touch control system as claimed in claim 4, wherein the digital backend is further configured to
    compare the beacon signal magnitude of the beacon frequency with function signal magnitudes of other function symbols to determine whether to enter the second detection interval.

7. The capacitive touch control system as claimed in claim 1, further comprising a driving circuit coupled to the touch panel, wherein the driving circuit does not output drive signals to the touch panel within the first detection interval, and
    the driving circuit outputs the drive signals to the touch panel within the second detection interval.

8. A capacitive touch control system, configured to receive a stylus pen signal, the capacitive touch control system comprising:
    a touch panel, comprising multiple pixels arranged in a matrix, and configured to detect a beacon frequency of a beacon symbol of the stylus pen signal within a first positioning interval of the stylus pen signal; and
    a readout circuit, comprising multiple sub-circuits, and configured to sequentially read all pixel rows and pixel columns of the multiple pixels using a first number of first readout intervals within the first positioning interval, wherein in each of the first readout intervals, each of the multiple sub-circuits reads one pixel row or one pixel column of the touch panel.

9. The capacitive touch control system as claimed in claim 8, wherein
    the beacon frequency is 25006.84 Hz,
    the readout circuit comprises 8 sub-circuits,
    the first number is 8, and
    the first readout interval is between 80 μs and 160 μs.

10. The capacitive touch control system as claimed in claim 8, wherein
    the touch panel is further configured to detect a first frequency of a first signal source of the stylus pen signal and a second frequency of a second signal source of the stylus pen signal corresponding to a second positioning interval of the stylus pen signal, and
    the readout circuit is further configured to sequentially detect a first part of the pixel rows and the pixel columns of the multiple pixels using a second number of second readout intervals within the second positioning interval, wherein the second number is smaller than the first number.

11. The capacitive touch control system as claimed in claim 10, wherein
    the first frequency is 161363.64 Hz, 205357.14 Hz or 196428.57 Hz,
    the second frequency is 175000 Hz, 178571.43 Hz or 169642.86 Hz,
    the second number is 6, and
    the second readout interval is 73.33 μs.

12. The capacitive touch control system as claimed in claim 10, wherein the first part of the pixel rows and the pixel columns is determined according to a first position of the stylus pen signal in the first positioning interval.

13. The capacitive touch control system as claimed in claim 10, wherein
    the touch panel is further configured to detect a third frequency of the first signal source and a fourth frequency of the second signal source corresponding to a third positioning interval of the stylus pen signal, and
    the readout circuit is further configured to sequentially detect a second part of the pixel rows and the pixel columns of the multiple pixels using a third number of third readout intervals within the third positioning interval, wherein the third number is smaller than the second number.

14. The capacitive touch control system as claimed in claim 13, wherein
    the third frequency is 165909.09 Hz, 205357.14 Hz or 196428.57 Hz,
    the fourth frequency is 175000 Hz, 178571.43 Hz or 169642.86 Hz, the third number is 4, and the third readout interval is 110 μs.

15. The capacitive touch control system as claimed in claim 13, wherein the second part of the pixel rows and the pixel columns is determined according to a second position of the stylus pen signal in the second positioning interval.

16. The capacitive touch control system as claimed in claim 13, wherein the touch panel is further configured to perform a touch detection between the second positioning interval and the third positioning interval.

17. A capacitive touch control system, configured to receive a stylus pen signal, the capacitive touch control system comprising:

a readout circuit, comprising multiple sub-circuits; and a touch panel, comprising multiple pixels arranged in a matrix, and configured to operate in a first mode or a second mode, wherein in the first mode, the touch panel is configured to time-divisionally detect a beacon frequency of a beacon symbol of the stylus pen signal within a first detection interval and perform a touch detection within a second detection interval corresponding to a beacon length interval of the beacon symbol, and in the second mode, the readout circuit is configured to sequentially read all pixel rows and pixel columns of the multiple pixels using a first number of first readout intervals within a first positioning interval of the stylus pen signal, wherein in each of the first readout intervals, each of the multiple sub-circuits reads one pixel row or one pixel column of the touch panel.

18. The capacitive touch control system as claimed in claim 17, wherein the first detection interval is smaller than (the beacon length interval-a minimum sync time)/2 and is larger than a reciprocal of the beacon frequency of the beacon symbol.

19. The capacitive touch control system as claimed in claim 17, wherein in the second mode, the touch panel is further configured to detect a first frequency of a tip and a second frequency of a ring corresponding to a second positioning interval of the stylus pen signal, and the readout circuit is further configured to sequentially detect a first part of the pixel rows and the pixel columns of the multiple pixels using a second number of second readout intervals within the second positioning interval, wherein the second number is smaller than the first number.

20. The capacitive touch control system as claimed in claim 19, wherein in the second mode, the touch panel is further configured to detect a third frequency of the tip and a fourth frequency of the ring corresponding to a third positioning interval of the stylus pen signal, and the readout circuit is further configured to sequentially detect a second part of the pixel rows and the pixel columns of the multiple pixels using a third number of third readout intervals within the third positioning interval, wherein the third number is smaller than the second number.

* * * * *